(12) United States Patent
Hu et al.

(10) Patent No.: US 7,012,650 B2
(45) Date of Patent: Mar. 14, 2006

(54) START/STOP AUDIO ENCODER APPARATUS AND METHOD FOR SYNCHRONIZING DIGITAL AUDIO AND VIDEO SIGNALS

(75) Inventors: Fengduo Hu, Cupertino, CA (US); Lin Yin, Fremont, CA (US); Yew-Koon Tan, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 638 days.

(21) Appl. No.: 09/881,404

(22) Filed: Jun. 14, 2001

(65) Prior Publication Data

US 2002/0191107 A1    Dec. 19, 2002

(51) Int. Cl.
*H04N 9/475* (2006.01)
(52) U.S. Cl. ...................... 348/515; 704/278
(58) Field of Classification Search ............... 348/515, 348/500, 512, 423.1; 375/240.28; 704/278; 386/39, 96, 98, 101, 104
See application file for complete search history.

(56) References Cited

U.S. PATENT DOCUMENTS

| | | | | |
|---|---|---|---|---|
| 5,040,081 | A * | 8/1991 | McCutchen ................. 386/66 |
| 5,247,300 | A * | 9/1993 | Sohn ........................ 341/155 |
| 5,396,497 | A * | 3/1995 | Veltman ................ 375/240.25 |
| 5,506,932 | A * | 4/1996 | Holmes et al. ............. 704/205 |
| 5,581,748 | A * | 12/1996 | Anderson ................... 713/502 |
| 5,598,352 | A * | 1/1997 | Rosenau et al. ......... 715/500.1 |
| 5,664,044 | A * | 9/1997 | Ware ........................... 386/75 |
| 5,726,989 | A * | 3/1998 | Dokic ........................ 370/509 |
| 5,748,842 | A * | 5/1998 | Holmes et al. ............. 704/270 |
| 5,771,075 | A * | 6/1998 | Rim et al. .................. 348/512 |
| 5,784,119 | A * | 7/1998 | Noda et al. ................. 348/512 |
| 5,880,788 | A * | 3/1999 | Bregler ....................... 348/515 |
| 6,049,769 | A * | 4/2000 | Holmes et al. ............. 704/278 |
| 6,088,063 | A * | 7/2000 | Shiba ......................... 348/515 |
| 6,101,591 | A * | 8/2000 | Foster et al. ................ 711/219 |
| 6,262,777 | B1 * | 7/2001 | Brewer et al. .............. 348/515 |
| 6,285,405 | B1 * | 9/2001 | Binford et al. ............. 348/512 |
| 6,496,233 | B1 * | 12/2002 | Christine et al. ....... 375/240.02 |
| 6,583,821 | B1 * | 6/2003 | Durand ....................... 348/515 |
| 6,639,649 | B1 * | 10/2003 | Fredlund et al. ............... 352/12 |

* cited by examiner

*Primary Examiner*—Paulos M. Natnael
(74) *Attorney, Agent, or Firm*—Wood, Herron & Evans, L.L.P.

(57) ABSTRACT

The invention uses digital signal processing (DSP) techniques to synchronize an audio encoding process with a video synchronization signal. Namely, the encoder parameters of a DSP microchip are preset according to characteristics of an audio frame. A buffer temporarily stores the audio frame prior to sending it to an encoder. The buffer then transfers the frame in response to receiving a video synchronization signal in conjunction with authorization from a microprocessor. As such, the encoding sequence of the audio frame coincides with the video synchronization signal. Since the corresponding video frame is already slaved to the video synchronization signal, the audio samples are effectively processed in sequence with the video data. Prior to outputting the encoded audio frame to a multiplexor, the encoder sends a value to the microprocessor representing the difference between the end of the encoded audio frame and a second video synchronization signal. Those audio samples are ultimately discarded from the bitstream. Thus, synchronization is achieved by beginning and effectively ending the encoding processes of both the audio and video data, respectively, in sequence with a common video synchronization clock.

46 Claims, 3 Drawing Sheets

START/STOP AUDIO ENCODER APPARATUS AND METHOD FOR SYNCHRONIZING DIGITAL AUDIO AND VIDEO SIGNALS

FIELD OF THE INVENTION

The present invention relates to digital signal processing, more particularly, this invention relates to a technique for synchronizing the timing of multiplexed packetized audio with digital video information.

BACKGROUND OF THE INVENTION

The ability to precisely synchronize audio and video data is crucial to the electronics, entertainment and communications industries. However, substantial design challenges remain inherent to the digital signal processing (DSP) techniques used to achieve synchronicity. For example, audio signals must be separated and independently processed from their corresponding video signals. Further, the processing times of the audio and video data vary as functions of both their respective sampling rates and of the hardware used in processing applications. Still, industry standards demand that the playback of the audio and video be synchronized, providing for a coordinated and coherent reproduction of the source material.

A program source often formats the audio and video data in respective data packets according to Moving Picture Expert Group (MPEG) principles. This format allows for each of the audio and video data packets to be received from the source in a continuous data stream for ease of storage and transmission. Packets of video data separated from the data stream include header blocks that are followed by data blocks. The data blocks may include a full field of video data or a coded group of pictures that includes its own header block identifying the picture type and display order. The header block for a video data packet includes control information, such as format identification and compression information, picture size, display order, and other global parameters.

Similarly, audio data packets have header blocks that identify the format of the audio data along with instructions relating to the encoding parameters of the audio samples. Such parameters include bit rate, compression information, as well as sampling frequency identification. Additional processing instructions may be provided for desired enhancements, if applicable. Following the header block, the audio data packet contains any number of audio frames corresponding to the video data.

Selected header blocks include presentation time stamp (PTS) values that indicate the decoding time for a frame of video data or a batch of audio samples. The time stamp value is a time reference to a system time clock that was running during the creation or recording of the audio and video data. A similar system time clock is also running during the playback of the audio and video data.

During the decoding of the audio data, audio samples must normally be decompressed, reconstructed and enhanced in a manner consistent with the source of program material and the capabilities of the sound reproduction system. In some applications, audio data packets may contain up to six channels of raw audio data. Depending on the number of channels the sound reproduction system can reproduce, the system selectively uses the channels of raw audio data to provide a number of channels of audio that are then stored in an audio first-in, first-out (FIFO) memory. The decoding of the video data likewise requires decompression, as well as the conversion of partial frames into full frames prior to storage in a video FIFO.

The FIFOs have write and read pointers that are controlled by a memory controller. The controller, in turn, is under the general control of a CPU. The write pointers are driven according to the requirements of the demultiplexing process, which sequentially delivers data to each of the FIFOs. The read pointers are driven as a function of independent and parallel decoding process, which sequentially reads data from the FIFOs. While the data is being loaded into the FIFO memories by the demultiplexing process, audio and video data is simultaneously and in parallel being read from the respective FIFOs during decoding and playback processes.

A host, or suitable microprocessor, monitors the audio and video decoding processes and coordinates the rates that the video and audio data are output to the multiplexor for eventual combination. The output frequency of audio samples is calculated by multiplying the number of samples in the audio block by the audio sampling rate. The output frequency of the video signal is slaved to the video synchronization signal. Ideally, the sampling intervals at which the video data and the audio samples are decoded would coincide. Further, if the audio and video data could be processed and played back at the times represented by their time stamps, the data will be presented to the user in the desired, synchronized manner.

However, the differences in the processing of the audio and video data in separate, parallel bit streams does not facilitate such precise timing control. The loss of synchronicity is in part attributable to a sampling discrepancy between the video synchronization signal and the audio sampling rate. Namely, the frequency of the video signal is 29.97 Hz, while audio samples clock at 32 kHz, 44.1 kHz or 48 kHz. Furthermore, there are a fractional number of 32 kHz, 44.1 kHz or 48 kHz audio samples. The inherent sampling size differential translates into a loss of synchronization on the order of one part per thousand, i.e., 60.0 Hz*1000/1001=59.94 Hz, fractional sample rate offset of 525/60 video relative to its nominal 60 Hz field rate. This sampling disparity causes the analog/digital converter to incrementally read the audio and video out of synchronicity. Over time, accumulated losses of synchronization can compound to the point where the loss of synchronization is perceptible to the user.

DSP techniques are used to compensate for differences between the audio/video sampling rates. One method of mitigating processing error involves manipulating the buffer rate, or the rate at which data is transferred and accepted into the decoder buffer. Similar rate adjustment may be effected when the data is transferred out of the buffer. In the case of video this can be done by adjusting the frame rate. In the case of audio, this is accomplished by adjusting the sampling rate. However, such rate adjustments involve extensive programming and processing delays. Further, adjustments of the decoder and transfer bit rate are restricted by characteristics of the peripheral hardware. Therefore, if the buffer error (i.e. deviation from the ideal buffer fullness) is too large, the appropriate control can become difficult or impossible.

Other DSP techniques skip or repeat frames of video data or batches of audio samples in order to control the buffer output data rate. Still another method adjusts the system time clock prior to repeating frames.

However, such applications, while achieving synchronization, sacrifice precision by materially altering a portion of the original source data.

Other techniques for achieving synchronization involve reducing the audio sample rate by one part per thousand, rounding up the published rate, i.e., by publishing enough significant digits to show the error, and calling that rate "synchronized to video." Thus 44.056 kHz becomes "44.1 kHz synchronized to video" and 47.952 kHz becomes "48 kHz synchronized to video." However, this approach can be misleading to the consumer and is incompatible with standard sample rates.

Still another technique blocks the audio data into unequal frames of audio. For instance, digital video tape recorders format data into a five frame, i.e., ten field, sequence using multiple, unequal audio frames of 160 and 161 samples. This unequal block format also requires a separate linear control track containing the frame sequence, and is suboptimal for field-based digital disk recording.

The same buffers that play an integral role in the above DSP techniques are themselves susceptible to storage and transfer errors that contribute to synchronization loss. A common example of such an error results from the varying processing requirements of individual audio DSP microchips. Namely, every chip requires a unique amount of start-up time prior to encoding in order to prepare for the encoding parameters of incoming data. Encoding parameters identify such critical encoding characteristics as the sampling frequency and bit rate of a frame, which determines the compression ratio. Thus, inconsistent start-up delays between audio and video DSP microchips conducting parallel applications further disrupt synchronization efforts.

Figure 1:
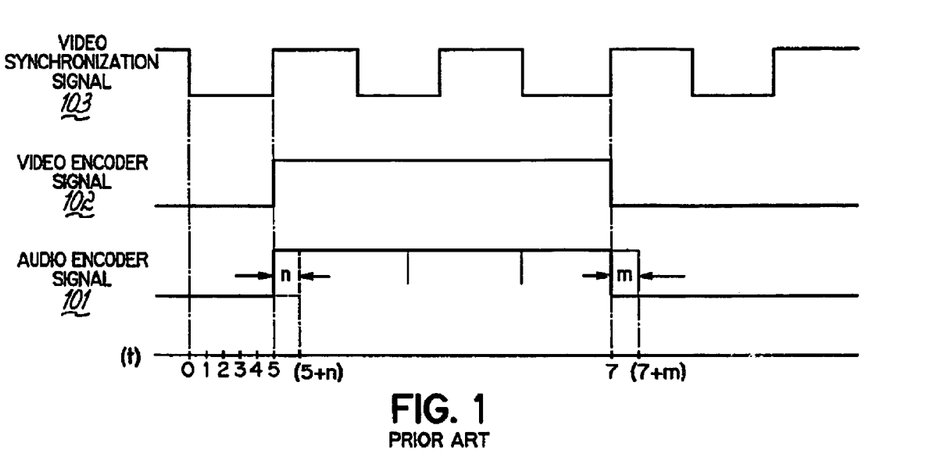
FIG. 1 is a graph representative of audio and video encoder signals as a function of time in accordance with the prior art.

The graph of FIG. 1 illustrates the relative timing activities and inconsistencies of an audio and video encoder in accordance with the prior art.

For purposes of the graph, an elevated value of an encoder signal indicates that the encoder is actively processing a data packet. For example, the video encoder signal 102 of FIG. 1 indicates that the video encoder begins encoding a video data packet coincident with the raised edge of the signal at t=5. A corresponding video synchronization clock signal 103 is also depicted for comparison purposes.

The graph shows the disparity between the activities of the audio and video encoders that results in the audio packet being encoded at a point some n samples after the video encoding process was initiated. In temporal terms of the graph, the video encoding process and signal 102 begin at t=5 while the audio encoding signal 101 does not become active until t=5+n. As further evidenced by the encoding signals 101, 102, the video encoding process 102 for a data packet ends at t=7, while the audio signal 101 continues until t=7+m. As discussed above, these encoding differentials cause a loss of synchronization between the audio and video signals.

Consequently, in a system such as that described above, there is a need to improve the synchronization of digital audio with digital video in such a manner that does not require repeating or losing data, restricting the sample rate, or relying upon unequal block formatting.

SUMMARY OF THE INVENTION

The present invention provides a method and apparatus for improving the synchronization of the playback of the audio and video frames from a program source. The invention uses digital signal processing techniques to synchronize the audio encoding process with the video synchronization signal. Namely, a buffer of a digital signal processor temporarily stores an audio frame prior to initiating an encoding sequence.

The encoding parameters of the DSP are set in accordance with a preparatory signal transmitted from a host. The encoding parameters include such frames characteristics as sampling frequency and bit rate, and may be repeated from a prior DSP application.

After receiving confirmation from the DSP that the encoding parameters are set, the host transfers a start signal to the DSP. The start signal instructs the DSP to begin encoding the audio frame in response to a first video synchronization signal. As such, the encoding sequence of the audio frame coincides with the video synchronization signal. Since the corresponding video frame is already slaved to the video synchronization signal, the audio samples are effectively processed in sequence with the video data. A stop command is issued from the host to the DSP, instructing it to count the audio samples of the audio frame that occur after a second video synchronization signal is received. The DSP complies with the command by counting the number of samples of the audio frame representing a time duration equal to the difference between the second video synchronization signal and a last encoded sample of the audio frame. The count of samples is communicated to the host and the samples are ultimately discarded upon recombination with the video stream. The entire encoded audio frame is then transmitted from the DSP to a multiplexor.

The above and other objects and advantages of the present invention shall be made apparent from the accompanying drawings and the description thereof.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

The encoding process described below utilizes a host microprocessor and a digital signal processor (DSP) to synchronize the start and end encoding sequences for audio and video signals. Namely, the encoding processes of both signals are made to be in synchronization with a common reference, or video synchronization signal. To achieve this synchronization, the encoding parameters of an audio DSP chip are preset according to characteristics of an audio packet. A buffer temporarily stores the audio data until a video synchronization signal is received. Since the associated video frame is already slaved to the video synchronization clock, the audio data is effectively processed in sequence with the video data. A value representing the difference between the end of the encoded audio frame and a second video synchronization signal is communicated to the host. Those samples are ultimately truncated so that the resultant audio frame does not exceed the length of the encoded video frame. Descriptions of the equipment, products and methodologies used to accomplish the above are outlined below.

Figure 2:
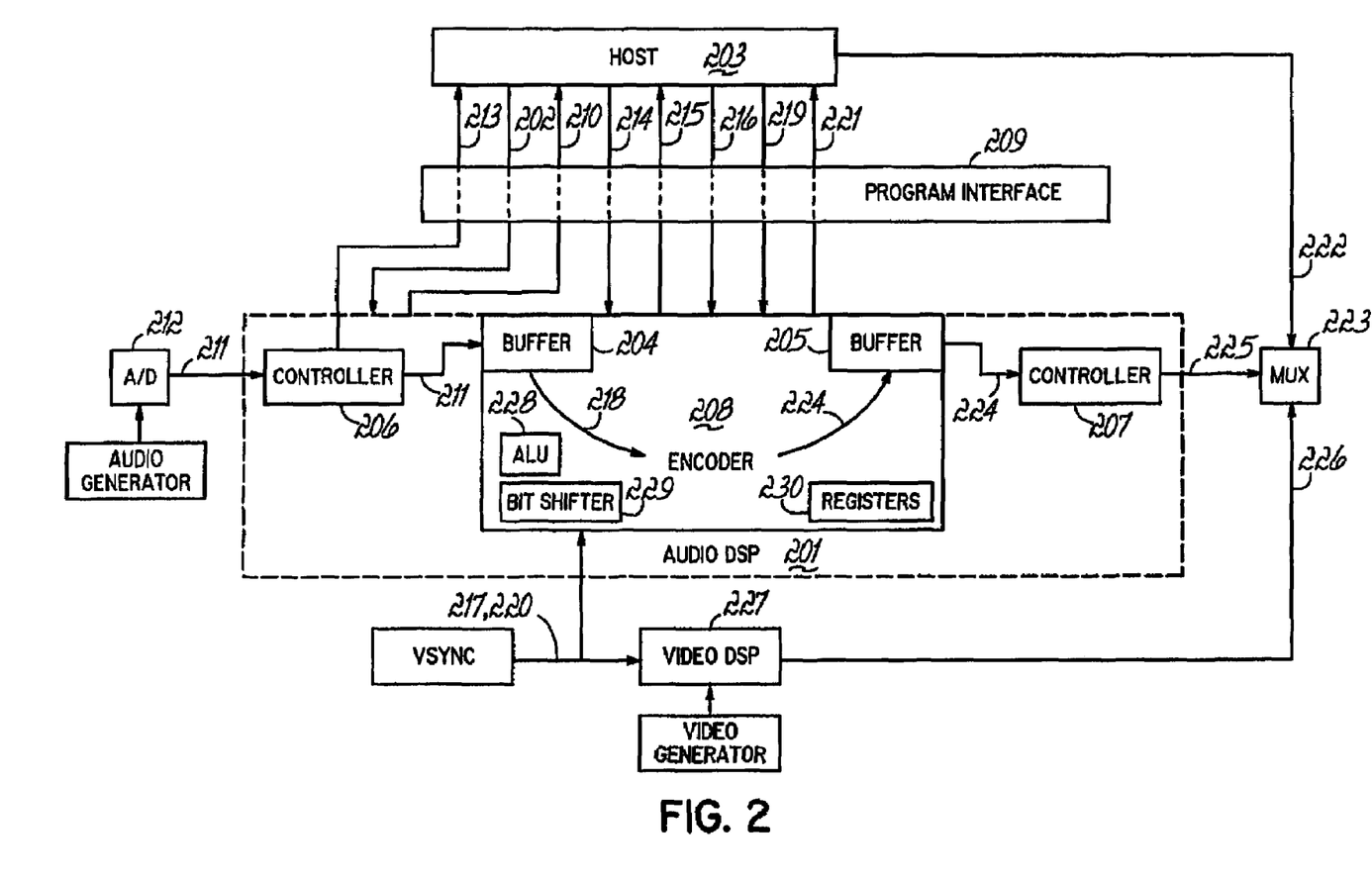
FIG. 2 is a schematic block diagram of an audio/visual encoding apparatus in accordance with the principles of the present invention.

Turning generally to FIG. 2, a digital signal processor (DSP) 201 and processing environment that is consistent with the principles of the invention is illustrated. The exemplary DSP microchip 201 includes two controllers 206, 207 for decoding processing instructions sent from a host 203. The pace of the decoding is typically at the rate of one instruction per clock cycle (or slower). An input controller 206 decodes each instruction and relays it to a buffer 204 and an encoder 208 to perform the actions required by the instruction. Through programmed combinations of instructions, any variety of data processing operations can be accomplished.

The encoder 208 of a DSP 201 typically includes a number of registers 230 for storing data that is being processed, an arithmetic and logic unit (ALU) 228 for performing logical (e.g., AND, OR, XOR) operations, as well as arithmetic (addition, multiplication, division) operations, and a parallel-connected bit shifting unit 229 for performing bit shifting and masking. The buffers 204, 205 of the encoder are operable to temporarily store and transfer audio data according to the decoded host instructions. The host 203, itself, is responsible for orchestrating and coordinating the processing of audio data, as well as for its eventual recombination with video data at a multiplexor 223. Communications between the host 203 and the DSP 201 are facilitated by a program interface 209 layer throughout the coding process.

More specifically, a boot command 202 is transmitted from the host 203 to the digital signal processor microchip (DSP) 201 for the purpose of initializing it. The buffers 204, 205 of the DSP 201 are reset in response, along with the input and output controllers 206, 207, which accept and transfer audio frames and communications to and from the encoder 208. The boot command 202 likewise activates a program interface 209 used to facilitate communication between the host 203 and the DSP 201. After initialization, a ready signal 210 is transmitted from the DSP 201 back to the host 203 confirming its initialized status.

An audio packet or frame is transmitted 211 from an analog/digital converter 212 to the input controller 206 of the digital signal processing microchip 201. The input controller 206 communicates the audio frame 211 to an encoder buffer 204, where it is temporarily stored. The encoded characteristics of the audio frame, including its frequency and bit rate, are communicated in a signal 213 to the host 203. The bit rate of an audio frame corresponds to its rate of compression.

The host 203 incorporates the above encoding information into a preparatory command 214 that is sent to the encoder 208. The preparatory command 214 specifies to the encoder 208 the parameters of the audio DSP 201 that must be set in order to encode the frame. A status signal 215 is communicated back to the host 203 when the parameter settings have been accomplished. This aspect of the invention insures that the DSP 201 is prepared to immediately begin encoding the buffered audio frame when prompted by the host 203. Specifically, the preparatory command 214 sequence avoids start-up delays particular to the DSP microchip 201. Since start-up delays, or the processing time required to set the encoding parameters for an application, vary for each DSP, they represent an unpredictable, additional source of incremental loss in synchronization.

Upon receiving the status signal 215, the host 203 sends a start command 216 to the audio DSP 201 instructing it to begin encoding the audio frame in response to a next occurring, or first video synchronization signal 217. Video synchronization signals are normally used to regulate the rate at which video data is encoded. Therefore, the processing rate of the parallel video application is driven by the video synchronization signals received by the video encoder. In the present invention, video synchronization signals are also transmitted to the audio encoder. However, though the signals are periodically received by the encoder 208, the encoder 208 does not give the video synchronization signals effect absent instruction from the host 203. Only after the host 203 queues the audio encoder 208 to respond to a designated video synchronization signal will the such a signal impact the audio encoding process.

After the start signal 216 is received by the encoder 208, the encoder 208 responds to the next occurring video synchronization signal 217 by transferring 218 the audio frame from the encoder buffer 204 to the encoder 208 for processing. Since the encoding parameters of the encoder 208 have been previously set according to the preparatory command 214, the encoder 208 is postured to immediately begin processing. Significantly, the initiation of the encoding sequence of the audio frame coincides with the same video synchronization signal 217 prompting the video encoding process. That is, a video frame is transferred from a video buffer to a video encoder of a video DSP 227, in response to the same, first video synchronization signal 217. Since both the audio and the video encoding processes are in synchronization with a common reference, the audio and video data, itself, remains synchronized for the duration of the decoding process. By synchronizing the two signals prior to leaving the encoding stage, later, more complicated synchronization measures are avoided.

At some point subsequent to initiating the encoding process, the encoder 208 receives a stop command 219 from the host. The stop command 219 instructs the encoder 208 to count the number of audio samples of the audio frame that occur after the arrival of a second video synchronization signal 220. This second video synchronization signal 220 coincides with the end of the video encoding process for the corresponding video frame. While the counted audio samples do contain audio encoding instructions, they contain no actual audio data that will be played back to a listener. Thus, the precision of the audio playback is not compromised if the samples are discarded. Furthermore, it is advantageous to clip or discard these samples prior to recombination with the coded video frame. Such modification ensures that the coded audio signal is the same length as the coded video signal, facilitating multiplexing.

The encoder 208 executes the command and reports in a signal 221 a value back to the host 203. That value represents the time duration required to process the counted audio samples. Accordingly, the host sends a command 222 to have the samples discarded upon recombination with the video frame at the multiplexor 223. The synchronized, coded audio frame is passed 224 through a second audio buffer 205 of the encoder 208 to an output controller 207 of the DSP 201. The output controller 207 forwards the coded frame 225 to the multiplexor 223. The synchronized audio frame is there combined with the corresponding video frame 226 by any known technique, such as by inserting the encoded audio signal into a blanking interval of the encoded video signal. Thereafter, the process sequentially decodes the audio and video input data to produce respective frames of audio and video that are presented to the user or undergo audio post-processing techniques.

Figure 3:
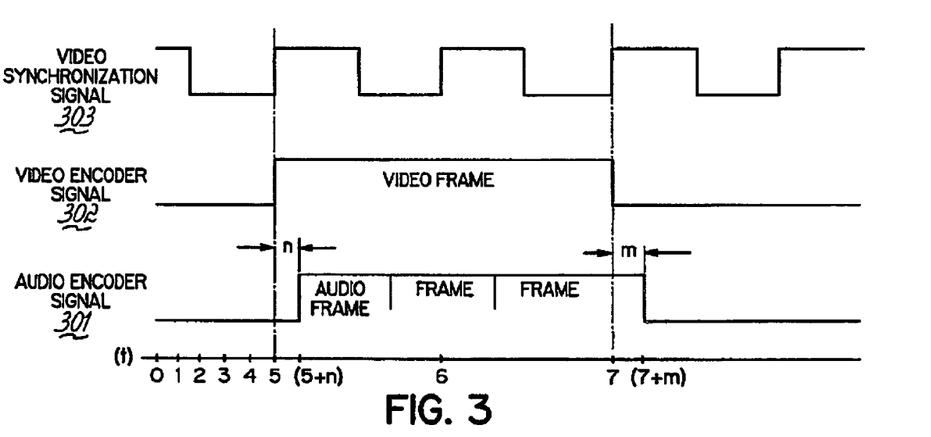
FIG. 3 is a graph showing the signals of FIG. 2 upon being processed in accordance with the principles of the present invention.

In accordance with the principles of the present invention, loss of synchronization is avoided because the audio encoding process 301 is made to be responsive to the same video synchronization signal 303 that drives the video encoding process 302. The graph of FIG. 3 illustrates the relative timing activities of audio and video encoder signals 301, 302, respectively, that reflect the processing techniques of the present invention. For purposes of the graph, an elevated signal positive value of a given encoder signal indicates that the encoder is actively processing a corresponding data packet. For example, the audio encoder signal 301 of FIG. 3 indicates that the audio encoder begins encoding an audio data packet at t=5+n.

At t=1, an incoming audio data packet is temporarily stored in a buffer. At some time prior to t=5+n, a corresponding video packet is likewise stored in a video encoder buffer. At t=2 and 3, boot and preparatory commands, respectively, from a microprocessor host ensure that all of the encoding parameters, controllers and buffers of the DSP are set to accommodate the audio packet. This feature enables the DSP to begin encoding the audio frames immediately, without the equipment-born start-up delays that would otherwise retard synchronization.

At t=4, the audio DSP receives authorization from the host to begin encoding the audio packet precisely upon receiving a first synchronization signal. By buffering the audio packet until t=5+n (or for n samples), the audio encoding process and signal 301, coincides with, and is synchronized with, the video synchronization clock signal 303. The first video synchronization signal is pulsed at t=5 which causes the audio encoder to receive and process the audio packet. The encoding of the corresponding video packet, which has likewise been buffered until this point, also begins in sequence with the video synchronization signal received at t=5+n.

At some point (t=6) after the first synchronization signal is received, the host sends a stop command to the audio DSP. The command instructs the audio encoder to count the number of audio samples that are processed after a second video synchronization signal is received at t=7. Since the second video synchronization signal coincides with the end of the video encoding signal 402, the value m represents the time required to process those audio samples that occur after the encoding of the video frame is over. The counted m samples contain no necessary audio data outside of carrying information related to encoding. Since these samples are unnecessary for playback, the value m is communicated back to the host, which ensures that the samples are decoded at playback.

Thus, by starting the audio encoding process in sequence with the video synchronization signal at t=5+n, and by further discarding the encoding samples (m) of the audio frame that extend beyond the length of the video frame, the resultant, coded audio frame that is sent to the multiplexor is customized and synchronized according to the length and timing of the video frame. As shown in the figure, the resultant processes of the audio and video encoders both begin at t=5+n and effectively end at t=7.

Figure 4:
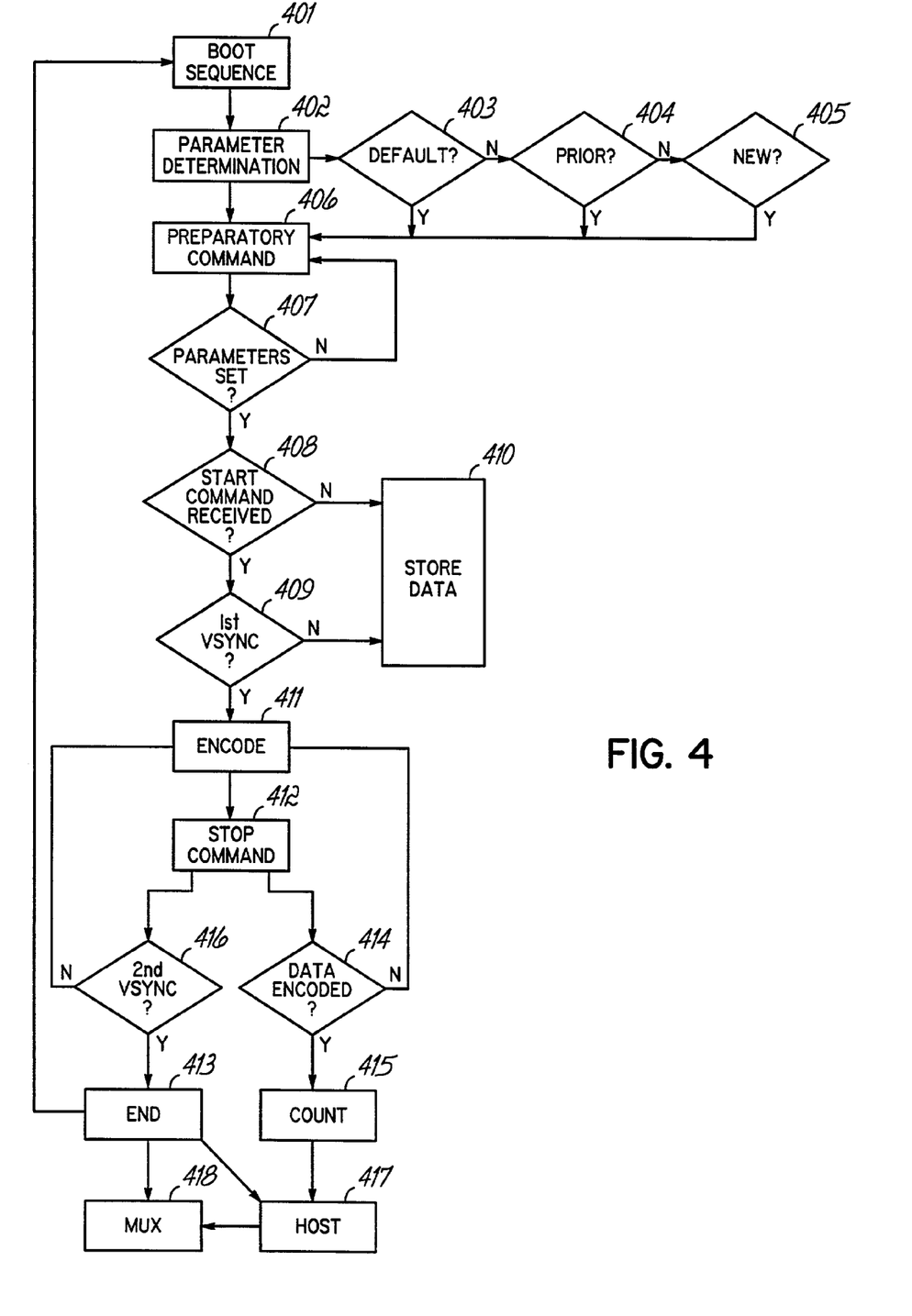
FIG. 4 is a flow chart illustrating the steps of a portion of the encoding process executed by the apparatus of FIG. 1 in accordance with the principles of the present invention.

FIG. 4 is a flow chart outlining the sequence of commands and processes characteristic of one embodiment of this invention. A host sends a boot command 401 to an audio digital signal processor to initialize the encoder. The initialization process includes resetting the input and output buffers, as well as programming interfaces between the host and the encoder. The encoder then notifies the host that it is ready to accept encoding parameter settings. Such encoding parameters include the frequency at which the audio data packet is transmitted, as well as the bit rate of the packet, which indicates the rate at which the packet has been compressed. At block 402, the host locates and retrieves the encoder parameters for the audio packet based upon communications from an input controller of the DSP. The input controller derives this information from header block of an incoming packet of audio data. The controller communications may indicate that the host should use a set of default encoding parameters 403, should repeat a previous set 404, or alternatively, should establish new parameters 405.

In either case, the encoding parameters are transmitted to the encoder in the form of a preparatory command 406. The encoder reads the preparatory command and adjusts its encoding parameter settings accordingly. For instance, the bit rate parameter setting of an encoder accomplishing an encoding sequence will be configured so as to be compatible with the compression ratio of the incoming audio data packet. The encoder having been thus initialized, a status signal at block 407 is transmitted back to the host informing it that the parameter settings have been accomplished.

Upon receiving the status signal, the host is ready to send a start command 408 to the encoder, authorizing the DSP to commence encoding in response to the next occurring video synchronization signal. Prior to receiving the start command, the DSP stores the audio data packet that awaits processing in a buffer at block 410. The buffer will continue to temporarily retain the packet until the first video synchronization signal is received. When the first video synchronization signal 409 is detected by the DSP, the encoder buffer 410 storing the audio data transfers the packet to the encoder, which begins processing the entire frame at block 411 after n samples.

The next command from the host to the encoder is a stop command 412. The stop command instructs the encoder to end 413 its processing function after completely encoding the audio data packet. Namely, after the encoder determines at block 414 that it has processed the last sample of the audio data packet is encoded, the hosts shuts-down the registers, arithmetic, logic and bit-shifting units of the encoder at block 413. The encoder sends the encoded audio data to the multiplexor 418 in anticipation of playback with the video data. The host repeats the boot and preparatory commands 401, 406 to the DSP according to the encoding requirements of a next frame of audio data. As before, the encoding parameters of a previous application may be reused, or new parameters may be specified as needed.

In parallel at block 415, the stop command prompts the encoder to count the number of audio samples processed subsequent to a designated second video synchronization signal. After determining at block 416 that the second video synchronization signal has been received, a time duration value representative of the processing time required by the samples is calculated at block 415. The value is then transmitted by the encoder to the host at block 417, along with a signal confirming the that the encoding process is complete.

The samples of the audio frame counted at block 415 contain only encoding instructions for the audio DSP and are superfluous to the playback of audio that actually coincides with played-back video. Therefore, the host ultimately discards those samples prior to recombining the remaining portion of the audio frame with the video data at block 418. Thus, the encoding process of the audio data that is ultimately combined with the video data has begun and ended in response to the same video synchronization signals that mark the beginning and end of the video encoding process.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A method of synchronizing a digital audio signal with a corresponding digital video signal comprising:
   receiving an audio frame sampled at an audio sampling rate at a digital signal processor;
   temporarily storing the audio frame in the digital signal processor prior to encoding;
   setting the encoding parameters of the digital signal processor prior to receiving
   a start command from a host;
   receiving the start command from the host instructing the digital signal processor to
   begin encoding the audio frame in response to a first video synchronization signal;
   receiving the first video synchronization signal at the digital signal processor;
   encoding the same audio frame at the audio sampling rate at which the audio frame was received upon receiving the first video synchronization signal.

2. A method of synchronizing a digital audio signal with a corresponding digital video signal according to claim 1, further comprising transmitting a boot command from the host to the digital signal processor.

3. A method of synchronizing a digital audio signal with a corresponding digital video signal according to claim 2, wherein the boot command resets a buffer of the digital signal processor along with a controller.

4. A method of synchronizing a digital audio signal with a corresponding digital video signal according to claim 2, wherein the controller is operable to accept and transfer the audio frame and communications from and to the encoder.

5. A method of synchronizing a digital audio signal with a corresponding digital video signal according to claim 2, wherein the buffer is operable to store and transfer the audio frames.

6. A method of synchronizing a digital audio signal with a corresponding digital video signal according to claim 2, wherein the boot command activates a program interface that facilitates communications between the host and the digital signal processor.

7. A method of synchronizing a digital audio signal with a corresponding digital video signal according to claim 2, further comprising sending a ready signal from the digital signal processor back to the host confirming the execution of the boot command.

8. A method of synchronizing a digital audio signal with a corresponding digital video signal according to claim 1, further comprising transmitting video synchronization signals to the audio encoder.

9. A method of synchronizing a digital audio signal with a corresponding digital video signal according to claim 1, further comprising communicating a plurality of encoding characteristics of the audio frame to the host.

10. A method of synchronizing a digital audio signal with a corresponding digital video signal according to claim 9, wherein the encoding characteristics reflect the frequency and the audio sampling rate of the audio frame.

11. A method of synchronizing a digital audio signal with a corresponding digital video signal according to claim 10, wherein the audio sampling rate of the audio frame corresponds to its rate of compression.

12. A method of synchronizing a digital audio signal with a corresponding digital video signal according to claim 1, further comprising sending a preparatory command to the encoder that sets a plurality of encoding parameters of the encoder according to the encoding characteristics of the audio sampling frame.

13. A method of synchronizing a digital audio signal with a corresponding digital video signal according to claim 1, wherein the encoding parameters reflect characteristics of the audio frame such as frequency and the audio sampling rate.

14. A method of synchronizing a digital audio signal with a corresponding digital video signal according to claim 1, wherein host uses the encoding characteristics to establish new encoding parameters, use default encoding parameters or repeat the encoding parameters from a previous application.

15. A method of synchronizing a digital audio signal with a corresponding digital video signal according to claim 1, wherein the first video synchronization signal is the next generated video synchronization signal immediately following the transmission of the start command from the host.

16. A method of synchronizing a digital audio signal with a corresponding digital video signal according to claim 1, further comprising transmitting a status signal back to the host when the encoding parameters of the encoder are set.

17. A method of synchronizing a digital audio signal with a corresponding digital video signal according to claim 1, wherein the beginning of the audio encoding process coincides with the same video synchronization signal that marks the beginning of the video encoding process.

18. A method of synchronizing a digital audio signal with a corresponding digital video signal according to claim 1, wherein the host is any suitable microprocessor.

19. A method of synchronizing a digital audio signal with a corresponding digital video signal comprising:
   receiving a first video synchronization signal;
   receiving a stop command from a host instructing a digital signal processor to count a number of audio samples of the audio frame occurring subsequent to an occurrence of a second video synchronization signal;
   receiving a second video synchronization signal at the digital signal processor;
   counting the number of samples of an audio frame representing a time duration equal to the difference between the second video synchronization signal and a last encoded sample of the audio frame; and
   discarding the counted samples prior to combining the remaining portion of the audio frame with the video frame in anticipation of playback.

20. A method of synchronizing a digital audio signal with a corresponding digital video signal according to claim 19, wherein the counted samples contain encoding instructions.

21. A method of synchronizing a digital audio signal with a corresponding digital video signal according to claim 19, wherein the ending of the audio encoding process coincides with the same video synchronization signal that marks the ending of the video encoding process.

22. A method of synchronizing a digital audio signal with a corresponding digital video signal according to claim 19, wherein the host is any suitable microprocessor.

23. A method of synchronizing a digital audio signal with a corresponding digital video signal according to claim 19, wherein the stop command further instructs the digital signal processor to cease encoding processes upon encoding the last sample of the audio frame.

24. A method of synchronizing a digital audio signal with a corresponding digital video signal according to claim 19, further comprising transmitting the encoded audio frame to a multiplexor to be combined with a corresponding video frame.

25. A method of synchronizing a digital audio signal with a corresponding digital video signal according to claim 19, further comprising transmitting video synchronization signals to the audio encoder.

26. A method of synchronizing a digital audio signal with a corresponding digital video signal according to claim 19, wherein the second video synchronization signal is the next generated video synchronization signal immediately following the transmission of the stop command from the host.

27. A data transmission apparatus for synchronizing an audio signal with a video signal, comprising:
an audio generating means for generating an audio frame at an audio sampling rate;
a video generating means for generating a video frame and a plurality of video synchronization signals;
a digital signal processor operable to temporarily store the audio frame, then encode the audio frame at the audio sampling rate in response to a first video synchronization signal, wherein the first video synchronization signal is the next generated video synchronization signal immediately following the transmission of a start command from the host, wherein the digital signal processor includes a number of registers for storing data being processed, an arithmetic and logic unit for performing logical operations as well as arithmetic operations, and a parallel-connected bit shifting unit for performing bit shifting and masking; and
a host microprocessor operable to send command signals to, and to set the encoding parameters of the digital signal processor application.

28. A data transmission apparatus for synchronizing an audio signal with a video signal according to claim 27, wherein the digital signal processor must first receive a start command from a host prior to encoding the audio frame.

29. A data transmission apparatus for synchronizing an audio signal with a video signal according to claim 27, wherein the digital signal processor comprises an encoder, a buffer and a controller.

30. A method of synchronizing a digital audio signal with a corresponding digital video signal according to claim 27, wherein the controller is operable to accept and transfer audio frames and communications from and to the encoder.

31. A method of synchronizing a digital audio signal with a corresponding digital video signal according to claim 27, wherein the buffer is operable to store and transfer audio frames.

32. A data transmission apparatus for synchronizing an audio signal with a video signal according to claim 27, wherein a plurality of video synchronization signals are generated periodically.

33. A data transmission apparatus for synchronizing an audio signal with a video signal according to claim 27, wherein the digital signal processor transmits the audio frame to the multiplexor upon encoding the audio frame.

34. A data transmission apparatus for synchronizing an audio signal with a video signal according to claim 27, including a programming interface present between the digital signal processor and the host to facilitate communication of a plurality of commands and status signals.

35. A data transmission apparatus for synchronizing an audio signal with a video signal according to claim 34, wherein the status signals include responses from the digital signal processor to host confirming the execution of the host's instructions.

36. A data transmission apparatus for synchronizing an audio signal with a video signal according to the claim 27, wherein the plurality of commands include communications from the host microprocessor to the digital signal processor authorizing the execution of processing functions, requesting status signals and setting encoding parameters.

37. A data transmission apparatus for synchronizing an audio signal with a video signal according to claim 27, further comprising a demultiplexor means for separating the audio signal and the video signal from a multiplexed signal in accordance with a control signal, prior to generation.

38. A data transmission apparatus for synchronizing an audio signal with a video signal, comprising:
an audio generating means for generating an audio frame;
a video generating means for generating a video frame and first and second video synchronization signals, wherein the second video synchronization signal is the next generated video synchronization signal immediately following a stop command from the host;
a digital signal processor operable to count a number of samples of an audio frame representing a time duration equal to a difference between the second video synchronization signal and a last encoded sample of the audio frame in response to receiving the stop command, wherein the digital signal processor includes a number of registers for storing data being processed, an arithmetic and logic unit for performing logical operations as well as arithmetic operations, and a parallel-connected bit shifting unit for performing bit shifting and masking;
a host microprocessor operable to generate and transmit the start command to the digital signal processor; and
multiplexor means for combining the encoded audio signal with the video signal.

39. A data transmission apparatus for synchronizing an audio signal with a video signal according to claim 38, wherein the digital signal processor transmits to the host a value corresponding to the time required to process the counted audio frames.

40. A data transmission apparatus for synchronizing an audio signal with a video signal according to claim 38, wherein the digital signal processor comprises an encoder, a buffer and a controller.

41. A method of synchronizing a digital audio signal with a corresponding digital video signal according to claim 38, wherein the host microprocessor is operable to accept and transfer audio frames and communications from and to the digital signal processor.

42. A method of synchronizing a digital audio signal with a corresponding digital video signal according to claim 40, wherein the buffer is operable to store and transfer audio frames.

43. A data transmission apparatus for synchronizing an audio signal with a video signal according to claim 38, wherein a plurality of video synchronization signals are generated periodically.

44. A data transmission apparatus for synchronizing an audio signal with a video signal according to claim 38, wherein the digital signal processor transmits the audio frame to the multiplexor means upon encoding the audio frame.

45. A data transmission apparatus for synchronizing an audio signal with a video signal according to claim 38, including a programming interface present between the digital signal processor and the host microprocessor to facilitate communication of a plurality of commands and status signals.

46. A method of synchronizing a digital audio signal with a corresponding digital video signal comprising:

receiving a first video synchronization signal;

receiving a stop command from a host instructing a digital signal processor to count a number of audio samples of the audio frame occurring subsequent to an occurrence of a second video synchronization signal;

receiving a second video synchronization signal at the digital signal processor, wherein the second video synchronization signal is the next generated video synchronization signal immediately following the transmission of the stop command from the host; and counting the number of samples of an audio frame representing a time duration equal to the difference between the second video synchronization signal and a last encoded sample of the audio frame.

* * * * *

UNITED STATES PATENT AND TRADEMARK OFFICE
CERTIFICATE OF CORRECTION

| | | |
|---|---|---|
| PATENT NO. | : 7,012,650 B2 | Page 1 of 1 |
| APPLICATION NO. | : 09/881404 | |
| DATED | : March 14, 2006 | |
| INVENTOR(S) | : Fengduo Hu, Lin Yin and Yew-Koon Tan | |

It is certified that error appears in the above-identified patent and that said Letters Patent is hereby corrected as shown below:

Column 2:

Lines 64-65, between the words "repeating frames." and "However, such applications, ....", please delete the paragraph indentation.

Column 3:

Lines 32-39, between the words "prior art." and "For purposes....", please delete the paragraph indentation.

Column 9:

Lines 23-24, between the words "receiving" and "a start command....;", please delete the return.

Lines 26-28, between the words "processor to" and "begin encoding....;" please delete the return.

Signed and Sealed this

Eighth Day of August, 2006

JON W. DUDAS
*Director of the United States Patent and Trademark Office*